US012549793B2

(12) United States Patent
Dietz (10) Patent No.: US 12,549,793 B2
(45) Date of Patent: Feb. 10, 2026

(54) SERVER-SIDE ADAPTIVE MEDIA STREAMING

(71) Applicant: streaMonkey GmbH, Leipzig (DE)

(72) Inventor: Fabian Dietz, Bayreuth (DE)

(73) Assignee: streaMonkey GmbH, Leipzig (DE)

( * ) Notice: Subject to any disclaimer, the term of this patent is extended or adjusted under 35 U.S.C. 154(b) by 0 days.

(21) Appl. No.: 17/765,567

(22) PCT Filed: Oct. 1, 2019

(86) PCT No.: PCT/EP2019/076556
§ 371 (c)(1),
(2) Date: Mar. 31, 2022

(87) PCT Pub. No.: WO2021/063488
PCT Pub. Date: Apr. 8, 2021

(65) Prior Publication Data
US 2022/0408135 A1 Dec. 22, 2022

(51) Int. Cl.
*H04N 21/2662* (2011.01)
*H04L 65/752* (2022.01)

(52) U.S. Cl.
CPC ....... *H04N 21/2662* (2013.01); *H04L 65/752* (2022.05)

(58) Field of Classification Search
CPC ..... H04L 47/70; H04L 65/1069; H04L 65/70; H04L 67/02; H04L 65/61; H04L 65/613; H04L 65/60; H04L 69/24; H04N 21/8456; H04N 21/23418; H04N 21/2402; H04N 21/44004; H04N 21/44209; H04N 7/173
See application file for complete search history.

(56) References Cited

U.S. PATENT DOCUMENTS

| | | | |
|---|---|---|---|
| 8,205,004 B1* | 6/2012 | Kaufman | H04L 65/70 375/240 |
| 9,356,821 B1 | 5/2016 | Jagannathan | |
| 10,547,659 B2* | 1/2020 | Zhang | H04L 67/02 |
| 2004/0098748 A1* | 5/2004 | Bo | H04N 7/173 725/105 |
| 2013/0013803 A1 | 1/2013 | Bichot et al. | |
| 2013/0044801 A1* | 2/2013 | Cote | H04N 21/8456 375/E7.026 |
| 2014/0089469 A1* | 3/2014 | Ramamurthy | H04L 65/613 709/219 |
| 2016/0073176 A1* | 3/2016 | Phillips | H04N 21/23418 725/35 |
| 2016/0134673 A1* | 5/2016 | MacInnis | H04L 65/61 709/231 |
| 2017/0126765 A1 | 5/2017 | Taibi et al. | |

(Continued)

FOREIGN PATENT DOCUMENTS

CN  108600789 A   9/2018
CN  108702542 A  10/2018
(Continued)

*Primary Examiner* — Dustin Nguyen
(74) *Attorney, Agent, or Firm* — The Webb Law Firm (57) ABSTRACT

A part of media is transmitted from a streaming server to a client and a transfer time is determined for the part of media. The transfer time is compared with a playback duration of the part of media. If the difference between the playback duration and the transfer time exceeds a preconfigured value, the bitrate of the media is adjusted.

23 Claims, 6 Drawing Sheets

(56) References Cited

U.S. PATENT DOCUMENTS

| | | | |
|---|---|---|---|
| 2017/0127101 A1* | 5/2017 | Rasool | H04N 21/8456 |
| 2017/0188069 A1 | 6/2017 | Mueller et al. | |
| 2018/0262439 A1* | 9/2018 | Moorthy | H04L 47/70 |
| 2018/0288459 A1* | 10/2018 | Ramaraj | H04L 65/1069 |
| 2018/0316949 A1* | 11/2018 | Banerjee | H04N 21/2402 |
| 2019/0208391 A1* | 7/2019 | Ryu | H04L 69/24 |
| 2019/0364084 A1* | 11/2019 | Huang | H04L 65/70 |
| 2020/0037007 A1* | 1/2020 | Mahvash | H04N 21/44004 |
| 2020/0037015 A1* | 1/2020 | Mahvash | H04N 21/44209 |
| 2023/0037292 A1* | 2/2023 | MacInnis | H04L 65/60 |

FOREIGN PATENT DOCUMENTS

| | | |
|---|---|---|
| EP | 2375680 A1 | 10/2011 |
| EP | 2477397 A1 | 7/2012 |
| RU | 2671946 C2 | 11/2018 |

* cited by examiner

SERVER-SIDE ADAPTIVE MEDIA STREAMING

CROSS-REFERENCE TO RELATED APPLICATION

This application is the United States national phase of International Application No. PCT/EP2019/076556 filed Oct. 1, 2019, the disclosure of which is hereby incorporated by reference in its entirety.

The disclosure relates to media streaming and in particular to a streaming server and a streaming method.

TECHNOLOGICAL BACKGROUND

There have been audio delivery technologies, such as Icecast and SHOUTcast, HTTP (HyperText Transfer Protocol) Live Streaming (HLS), and MPEG-DASH (Motion Picture Experts Group Dynamic Adaptive Streaming over HTTP). Icecast is a streaming media project including a server program capable of streaming wideband audio content such as Opus (RFC6716 or RFC8251) or Vorbis over HTTP, video such as as WebM or Theora over HTTP, and MP3, AAC, and NSV over the SHOUTcast protocol (which itself runs over HTTP).

Many or most of the existing streaming devices, at least those for audio only, support classical Icecast HTTP-based streaming which provides for a continuous delivery of audio content via HTTP. As the source audio is encoded, it is put into a buffer at the server side and transmitted to the clients. HLS and MPEG-DASH are working differently. Both use chunking, so audio is cut into pieces and put into respective audio files. These files can be delivered to clients via simple http servers.

MPEG-DASH works by breaking the content into a sequence of small HTTP-based file segments, each segment containing a short interval of playback time of content that is potentially many hours in duration, such as a movie or the live broadcast of a sports event. The content is made available at a variety of different bit rates (representations), i.e., alternative segments encoded at different bit rates covering aligned short intervals of the playback time. While the content is being played back by an MPEG-DASH client, the client uses a bit rate adaptation (Adaptive Bit Rate, ABR) algorithm to automatically select the segment with the highest bit rate possible that can be downloaded in time for playback without causing stalls or re-buffering events in the playback. MPEG-DASH uses HTTP over TCP (Transmission Control Protocol).

Most of the (standalone) streaming devices already present in the market do not support this kind of delivery.

SUMMARY

Non-limiting embodiments or aspects of the present disclosure relate to methods and apparatuses for streaming of media over data networks.

According to some non-limiting embodiments or aspects, a method is provided for media streaming over HTTP to be performed by a streaming server (200), the method comprising: receiving (S310) a request for media data from a client (300); transmitting (S320) to the client (300) a first transmission unit including a first part of media data encoded by applying a first type of encoding, determining (330) transfer time of the first transmission unit to the client, adjusting (S350) bitrate of the streaming based on the determined transfer time by transmitting a second transmission unit including a second part of the media data encoded by applying a second type of encoding differing from said first type of encoding by bitrate.

According to some non-limiting embodiments or aspects, the method further comprises: judging (S340) whether or not the determined transfer time differs from the media time by more than a predetermined amount, performing the adjusting step (S350), when the transfer time is judged to differ from the media time by more than the predetermined amount, and not performing the adjusting step (S350), when the transfer time is judged not to differ from the media time by more than the predetermined amount.

In some non-limiting embodiments or aspects, when the transfer time is judged to be higher than the media time by more than a first predetermined amount, the method includes transmitting the second transmission unit including the second part of the media data encoded by applying encoding with a bitrate lower than said first type of encoding.

In some non-limiting embodiments or aspects, when the transfer time is judged to be lower than the media time by more than a second predetermined amount, the method includes transmitting the second transmission unit including the second part of the media data encoded by applying encoding with a bitrate higher than said first type of encoding.

In some non-limiting embodiments or aspects, the method further comprises: waiting a predetermined waiting time period before transmitting the second transmission unit, the predetermined waiting time period being determined according to the media time.

In some non-limiting embodiments or aspects, the transmitting of the second transmission unit includes selecting, from a storage, a chunk including the second part of media data encoded with the second type of encoding among chunks including the second part of media data encoded with respective types of encoding different from the second type.

In some non-limiting embodiments or aspects, the method may further comprise: receiving requests for the media data from a plurality of clients, transmitting to the plurality of clients the media data in transmission units including media data with the same media time irrespectively of the type of encoding, transmitting to the plurality of clients additional media data in transmission units including media data with the same media time irrespectively of the type of encoding and a client, wherein the additional media data differs for the clients out of the plurality of clients by content.

In some non-limiting embodiments or aspects, the method may include: receiving from the client a connection request; establishing connection with the client in a client-specific thread; and storing a time instant of the connection start for the client.

Advantageously, the media data may include audio data. For example, the streaming may be an Icecast compatible streaming.

In some non-limiting embodiments or aspects, the method comprises: obtaining media data in chunks from a plurality of respective media files; ordering consecutive chunks into continuous stream; and transmitting the continuous stream to the client according to Icecast protocol.

According to some non-limiting embodiments or aspects, a computer program is provided stored on a non-transitory storage medium, which when executed on a processor, performs one or more steps of any of the non-limiting embodiments or aspects of the methods mentioned above.

According some non-limiting embodiments or aspects, a streaming server is provided comprising: an interface for HTTP streaming to a client and controllable by the processing circuitry; processing circuitry configured to: receive a request for media data from a client; transmit to the client a first transmission unit including a first part of media data encoded by applying a first type of encoding, determine transfer time of the first transmission unit to the client, adjust bitrate of the streaming based on the determined transfer time by transmitting a second transmission unit including a second part of the media data encoded by applying a second type of encoding differing from said first type of encoding by bitrate.

When referring to the processing circuitry as receiving or transmitting data, this may be implemented by controlling the interface to receive or transmit data. For example, the processing circuitry may receive or transmit data via the data interface. The data interface here may refer to a protocol stack for receiving and/or transmitting data, implemented in the streaming server. The implementation may be in a software and/or in hardware or partially in software and partially in hardware. Thus, the interface may also be implemented by the processing circuitry.

According to some non-limiting embodiments or aspects, the processing circuitry is further configured to: judge whether or not the determined transfer time differs from the media time by more than a predetermined amount, perform the adjusting step, when the transfer time is judged to differ from the media time by more than the predetermined amount, and not perform the adjusting step, when the transfer time is judged not to differ from the media time by more than the predetermined amount.

In some non-limiting embodiments or aspects, when the transfer time is judged to be higher than the media time by more than a first predetermined amount, transmitting the second transmission unit including the second part of the media data encoded by applying encoding with a bitrate lower than said first type of encoding.

Moreover, when the transfer time is judged to be lower than the media time by more than a second predetermined amount, transmitting the second transmission unit including the second part of the media data encoded by applying encoding with a bitrate higher than said first type of encoding.

In some non-limiting embodiments or aspects, the processing circuitry is configured to wait a predetermined waiting time period before transmitting the second transmission unit, the predetermined waiting time period being determined according to the media time.

In some non-limiting embodiments or aspects, the transmitting of the second transmission unit includes selecting, from a storage, a chunk including the second part of media data encoded with the second type of encoding among chunks including the second part of media data encoded with respective types of encoding different from the second type.

The processing circuitry may be configured to control the interface to: receive requests for the media data from a plurality of clients, transmit to the plurality of clients the media data in transmission units including media data with the same media time irrespectively of the type of encoding, transmit to the plurality of clients additional media data in transmission units including media data with the same media time irrespectively of the type of encoding and a client, wherein the additional media data differs for the clients out of the plurality of clients by content.

According to some non-limiting embodiments or aspects, the processing circuitry is further configured to: receive from the client a connection request; establish connection with the client in a client-specific thread; and store a time instant of the connection start for the client.

Advantageously, the media data may include audio data. For example, the streaming may be an Icecast compatible streaming.

In some non-limiting embodiments or aspects, the processing circuitry is configured to: obtain media data in chunks from a plurality of respective media files; order consecutive chunks into continuous stream; and transmit the continuous stream to the client according to Icecast protocol.

According to some non-limiting embodiments or aspects, a streaming system is provided comprising: the streaming server as described above further providing an interface to a storage; and the storage storing therein media data cut into chunks of the same media time duration encoded with different bitrates and/or using different codecs, wherein the storage comprises an interface for providing chunks to the streaming server.

Any of the above mentioned non-limiting embodiments or aspects may be combined.

In the following, non-limiting embodiments or aspects of the present disclosure are described in more detail with reference to the attached figures and drawings, in which.

In the following identical reference signs refer to the same or equivalent features if not explicitly specified otherwise. The figures are exemplary embodiments and do not limit the disclosure to those embodiments. Further features and options will become apparent from the following description.

DETAILED DESCRIPTION

Figure 1:
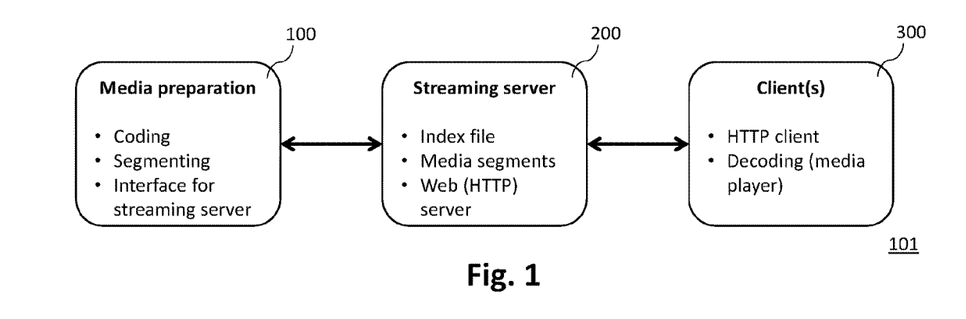
FIG. 1 is a block diagram showing an exemplary video streaming architecture based on HTTP.

FIG. 1 shows an exemplary streaming architecture including three functional blocks: media preparation 100, streaming server 200, and clients 300. These three functional blocks may be spatially separate. The media preparation block 100 may, in general, correspond to a server, a plurality of servers or to a cluster server. A function of the media preparation server(s) 100 is to prepare media for streaming. Media, such as audio, video and/or associated text information are provided to the media preparation server(s) 100, where the media is encoded and segmented. For example, the media may be provided via a network (e.g., any data network) or via any connectable storage medium to the media preparation server(s) 100 in a raw format (e.g., without compression, as captured by the recording device) or a format already encoded that may include lossless or lossy compression. The media preparation server(s) 100 encodes the media to obtain one or more representations of the encoded media having the respective one or more bitrates. The different media representations may be obtained with the same encoder or with several different encoders.

It may be desirable to segment the media into portions of the same or aligned playback duration. This may enable switching between different representations without compromising the continuity of the content at the client. The portions of the same playback duration are sometimes referred to as chunks. Although the playback duration of the portions is the same, in general, the length of the chunks in bits may differ between different representations and/or may differ within the same representation. The segmented chunks may be stored in the media preparation server(s) 100. The media preparation server(s) 100 may provide an interface over which the streaming server 200 may access the chunks, which may be any protocol for downloading the chunks.

It is noted that the media preparation server(s) 100 may be a simple media server corresponding to a file server merely storing the media segments. The media segments may be stored therein by the content providers from their respective sites and/or downloaded from the content providers regularly. Non-limiting embodiments or aspects of present disclosure are not limited by any particular implementation of the media preparation server(s) 100. For example, the media preparation server(s) 100 and the streaming server 200 do not have to be separate and may be implemented on the same server, a plurality of servers or cluster server.

The streaming server 200 receives a request from a client 300 for streaming, fetches the appropriate chunks and transmits them to the client 300. In the exemplary architecture of FIG. 1, the streaming server 200 communicates with the client(s) 300 via HTTP. This may include provision of an index file by the streaming server 200. An index file may be generated by the media preparation server 100 and/or at the streaming server. An index file corresponds to a playlist including references to the respective media chunks in the order in which the media chunks are to be requested and played-back at the client(s) 300. For example, in case of the HTTP streaming, the index may include the URL (Uniform Resource Locator) of the media files containing the chunks. However, non-limiting embodiments or aspects of the present disclosure may not require any index file, as they need not be limited to HLS or MPEG-DASH streaming or any streaming supporting index file listing a plurality of URLs. Rather, in order to provide HTTP streaming, a single URL address may be used.

The URL of the index file is published on the HTTP server, e.g., at the streaming server 200. Client (software) 300 reads the index, and requests the listed media files in order given by the index and plays the media files back continuously. For playing the media back, the decoder corresponding to the encoder used for media preparation may be applied at the client(s) 300. The client(s) 300 may communicate with the streaming server 200 over any kind of data network(s), which may include the Internet and/or access networks such as DSL based networks, wireless networks (e.g. WLAN, UMTS, LTE or the like), WANs/LANs, and/or the like.

The media preparation 100, the streaming server 200, and the one or more client(s) 300 form a streaming system 101.

A streaming server 200 and the corresponding streaming method are provided which dynamically deliver streaming content via HTTP(s) to streaming devices 300.

Figure 2:
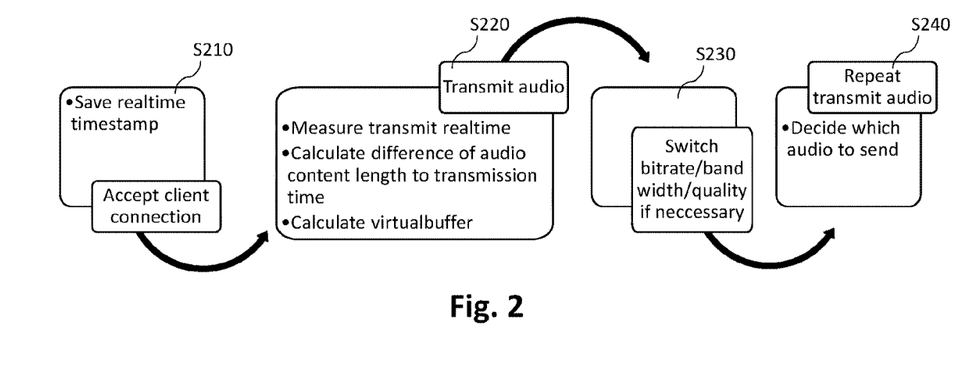
FIG. 2 is a schematic drawing illustrating a method for server-side adaption of bitrate for media streaming.

A high-level overview of the dynamic approach is illustrated in FIG. 2. In particular, in step S210, the streaming server 200 receives from a client 300 a request for streaming. In step S220, the streaming server 200 transmits the media to the client 300. In step S230, the server switches the representation of the media and transmits the media in step S240 with the adjusted (switched) representation. Further details of this approach are explained below.

Figure 3:
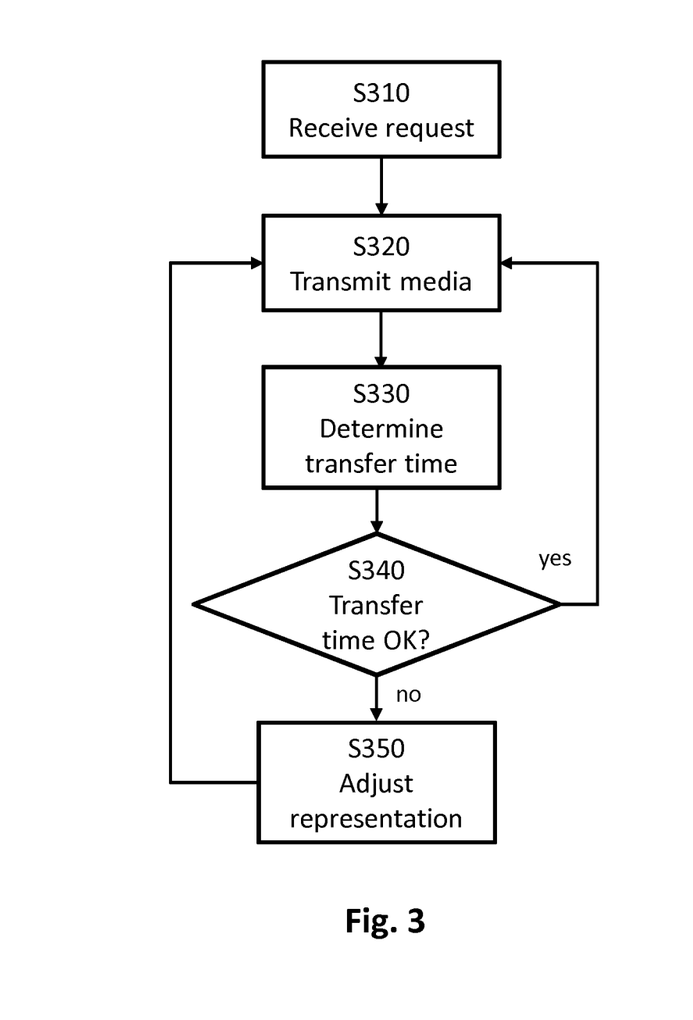
FIG. 3 is a flow chart illustrating a method performed at a streaming server for rate adaption.

According to some non-limiting embodiments or aspects, a method is provided for media streaming over HTTP to be performed by a streaming server 200. The method is illustrated in FIG. 3. The media may be audio, video and/or related text or graphics information, or any other media or their combination. The streaming sever may be any streaming source side, including one or more streaming servers and/or media (preparation) servers.

The method comprises receiving S310 a request for media data from a client 300 and transmitting S320 to the client 300 a first transmission unit including a first part of media data encoded by applying a first type of encoding. The method comprises determining S330 of a transfer time of the first transmission unit to the client, and adjusting S350 bitrate of the streaming based on the determined transfer time by transmitting S320 a second transmission unit including a second part of the media data encoded by applying a second type of encoding differing from said first type of encoding by bitrate (e.g., the second type of encoding may have a different bitrate than the first type of encoding).

The first and second units may be chunks of a media stream, so that the first chunk is earlier in the play-back sequence than the second chunk. The first type and the second type of encoding may be, for example, two representations of the same media encoded with different quality, thereby resulting in different bitrates. However, non-limiting embodiments or aspects of the present disclosure are not limited to providing two representations encoded by the same codec. The representations may be provided by different codecs. Here, the term quality may refer to application of different quantization step sizes and/or the like. The determination S330 of the transfer time may include measuring the transfer time and/or estimating the transfer time, e.g. based on measurements.

As can be seen in FIG. 3, the method may further comprise judging S340 whether or not the determined transfer time differs from the media time by more than a predetermined amount, performing the adjusting step, when the transfer time is judged to differ from the media time by more than the predetermined amount ("no" in step S340), and not performing the adjusting step, when the transfer time is judged not to differ from the media time by more than the predetermined amount ("yes" in step S340). The transfer time here may refer to a time interval necessary to transfer a chunk from the streaming server 200 to the client 300. The media time may refer to playback time (content length), i.e. time interval for playing-back the media of the chunk.

Figure 4:
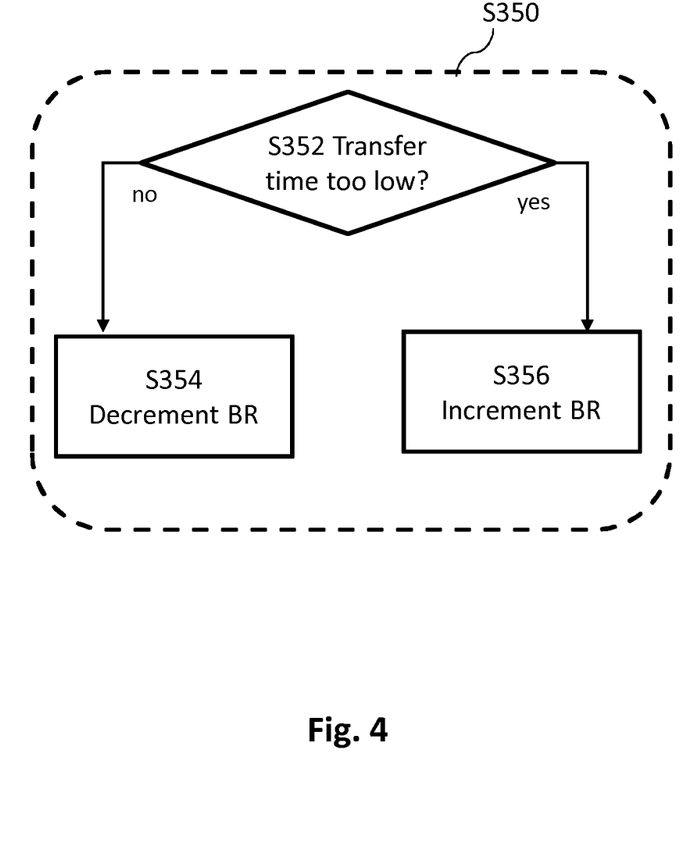
FIG. 4 is a flow chart illustrating details of a method performed at a streaming server for rate adaption.

FIG. 4 shows an exemplary adjustment S350 of the bitrate (e.g., corresponding to representation). When the transfer time is judged in step S352 to be higher than the media time by more than a first predetermined amount, the second transmission unit is transmitted S320 including the second part of the media data encoded by applying encoding with a bitrate lower than said first type of encoding. For example, the bitrate is decremented S354.

When, on the other hand, the transfer time is judged in step S352 to be lower than the media time by more than a second predetermined amount, the second transmission unit is transmitted including the second part of the media data encoded by applying encoding with a bitrate higher than said first type of encoding. For example, the bitrate is incremented S356.

The first predetermined amount may be any amount including 0. However, in practice, the first predetermined amount may be set according to the granularity of bitrate of representations of the same media. This is because the adjustment S350 may be performed by selecting another chunk of the same media encoded with a different bitrate. Chunks may not be provided for each and every bitrate value possible, but rather may provided in some steps such as 8 kbps, 16 kbps, 32 kbps, and/or the like. Non-limiting embodiments or aspects of the present disclosure are not limited to any particular bitrates or their granularity. The differences between the bitrates may be smaller, resulting in a finer adjustment but also higher storage requirements for the chunks. The differences between the bitrates may not be the same.

The first predetermined amount may, but does not necessarily have to, be the same as the second predetermined amount. These amounts may be determined by setting them to their respective values by the administrator/provider of the streaming server, and/or may be fixedly programed, and/or may be configurable in any other way.

The method according to an exemplary implementation, comprises a step of waiting a predetermined waiting time period before transmitting the second transmission unit, the predetermined waiting time period being determined according to the media time. This may be to avoid the client 300 requesting further chunks too early. For example, if the transfer time is lower than the playback time, after the adjustment, the bitrate is increased so that the transfer time is increased. In order to avoid the client 300 to request further chunk (e.g., media file) with the same low delay as before the adjustment, the waiting step is introduced.

As mentioned with reference to FIG. 1, the streaming server may transmit the second transmission unit by selecting, from a storage, a chunk including the second part of media data encoded with the second type of encoding among chunks including the second part of media data encoded with respective types of encoding different from the second type. The storage may be internal or external storage with respect to the streaming server. The storage may correspond to a file server (e.g., a media server) which may be a part of the media preparation server or cluster.

The media server is capable of handling requests from one or more client(s) 300. The method may comprise the steps of receiving requests for the media data from the plurality of clients, transmitting to the plurality of clients the media data in transmission units including media data with the same media time irrespectively of the type of encoding, transmitting to the plurality of clients additional media data in transmission units including media data with the same media time irrespectively of the type of encoding and a client, wherein the additional media data differs for the clients out of the plurality of clients by content.

For example, the (same or different) streaming to two clients may be added personalized data different from the requested streaming.

As an example, the step S210 may include receiving from the client a connection request; establishing connection with the client in a client-specific thread; and storing a time instant of the connection start for the client. The time instant of the connection start may be a timestamp.

While non-limiting embodiments or aspects of the present disclosure are not limited to any particular type of media, they may be readily applied to audio streaming. Thus, the media data may include audio data. However, non-limiting embodiments or aspects of the present disclosure are readily applicable to other kinds of media as well. For example, non-limiting embodiments or aspects of the present disclosure are applicable to video streaming as well as to general media streaming including audio and/or video and/or text or graphics information.

In an advantageous implementation, the streaming is an Icecast compatible streaming.

For example, the streaming server may apply a hybrid approach in order to comply with the Icecast. The streaming server side (e.g. the media preparation part 100) encodes the audio with different codecs and/or quality levels, corresponding to different bitrates. This encoded audio is also chunked (e.g., segmented) and put into respective files, each file containing one chunk. The audio-chunks are put together to a continuous stream, e.g. an AAC stream in an ADTS container, MP3 or Opus in Ogg container or any other stream format, again for delivery to the client 300 so that nearly all streaming devices are capable of playing audio in this way. For example, even streaming clients 300 not supporting chunked HTTP streaming such as HLS or DASH, which is the case for most standalone internet radios available today, may receive the audio.

Such streaming server 200 provides a HTTP server compatible with Icecast protocol so that broadcasters do not have to worry about how to connect to the streaming server since for most of them, they can do exactly the same as they did before using classic Icecast based streaming.

Icecast based (e.g., source) streaming may mean the delivery of encoded audio as continuous stream via HTTP PUT/SOURCE protocol and additional HTTP requests for updating the metadata and syncing (synchronizing) it to the media delivered. The streaming server side including the media preparation part 100 encodes the audio with different codecs and quality levels and stores chunks of files centralized. These audio chunks are the base of the delivery to client devices.

Returning to FIG. 2, in Step S210, the streaming server 200 accepts HTTP(s) client connection(s). One client may request one or more HTTP connections. The streaming server 200 answers using Icecast compatible http headers. Parsing the http request URL, the streaming server 200 decides which stream to deliver, e.g. mountpoint for Icecast. An Icecast (e.g., streaming) server can house multiple broadcasts (or mountpoints) each containing a separate stream of content. The mountpoint is a unique name on the (streaming or media) server identifying a particular stream. The mountpoint may correspond to a filename. A listener can listen to a single mountpoint at a time.

Each client connection may be handled using its own thread. The real time of the beginning of the connection is stored in memory. The real time means, for example, the absolute time. The server uses this time for different calculations afterwards, for example, for the purpose of determining the transfer time. With regard to mobile streaming, an audio buffer may be preferable. At the start of a new connection, a defined (e.g., real-time) length of audio material is transmitted as fast as possible to the client 300, e.g. 30 seconds real time of audio, meaning 30 seconds of playback. The server calculates the difference between the length of the audio content (30 seconds) and transmission time of the (one or more) video chunks including these 30 seconds of playback.

Afterwards, while still transmitting new audio to the client, the difference between the audio length and the transmission duration is calculated continuously (e.g., regularly), e.g. every predetermined time period. If the transmission of for instance 5 seconds of audio material takes 6 seconds, the buffer is lowering by 1 second. The server-side calculation of the client's buffer is internally called virtual buffer. The buffer is a measure for discrepancy between transmission time and playback time. For example, if transmission time is the same as playback time, which is the ideal case, no buffering at the client is necessary, the media can be played as it arrives. However, such situation is unlikely due to variations in bitrate of the media and variation in transmission media conditions including link quality and co-existing traffic. If the transfer time is lower than the playback time, the client may buffer media data until their playback time. If the transfer time is higher than the playback time, there may be no media data to be played at certain time instances, resulting in breaks and pauses in the streaming. Thus, it may be desirable to keep the difference between the transmission time and playback time as small as possible. On the other hand, when the transfer delay is greater than playback time, the perceived quality may be substantially lowered by the breaks. Thus, it may be desirable to have some non-zero buffer to compensate for possible delays.

For every transmission unit (e.g., which can be a complete audio chunk of defined length or even a single audio frame) the virtual buffer may be calculated and updated for this explicit session. It is noted that the transmission unit may be any specified time duration.

If the virtual buffer reaches a defined level the server decides if an adjustment of bandwidth/bitrate must should place. For example, if the virtual buffer is dropping below a threshold of 25 seconds, the bitrate can be lowered. In this case the server may fetch an audio chunk encoded using a lower bitrate setting. If the virtual buffer is rising again to a desired level, the quality/bitrate can be raised again for the next audio chunk to be transmitted.

If the desired virtual-buffer-level is reached, the server waits a defined time before transmitting the next audio part. The server may wait because the audio input is "only" at a real-time speed, otherwise the client may request audio material that has not been encoded yet or not even be transferred yet by the broadcaster.

Using this technique, it is also possible to explicitly exchange every audio chunk for every client session. Every millisecond of audio could be transferred to every client independent from the source. That makes it possible to replace advertisement or specified audio tracks for every listener if the broadcaster wishes to do so.

Figure 5A:
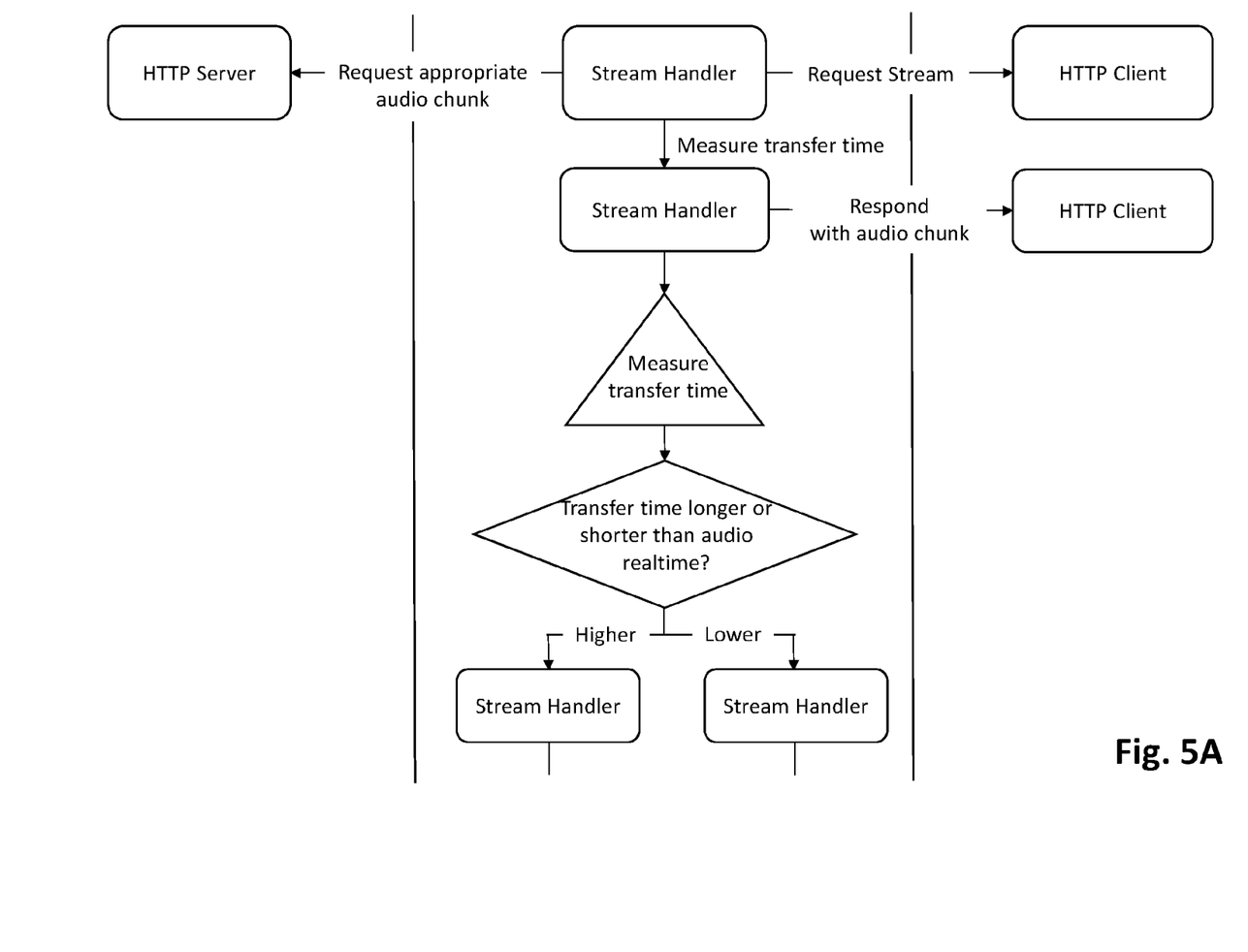
FIGS. 5A and 5B show, in combination, a message diagram showing interaction between media preparation part, streaming server and client.
Figure 5B:
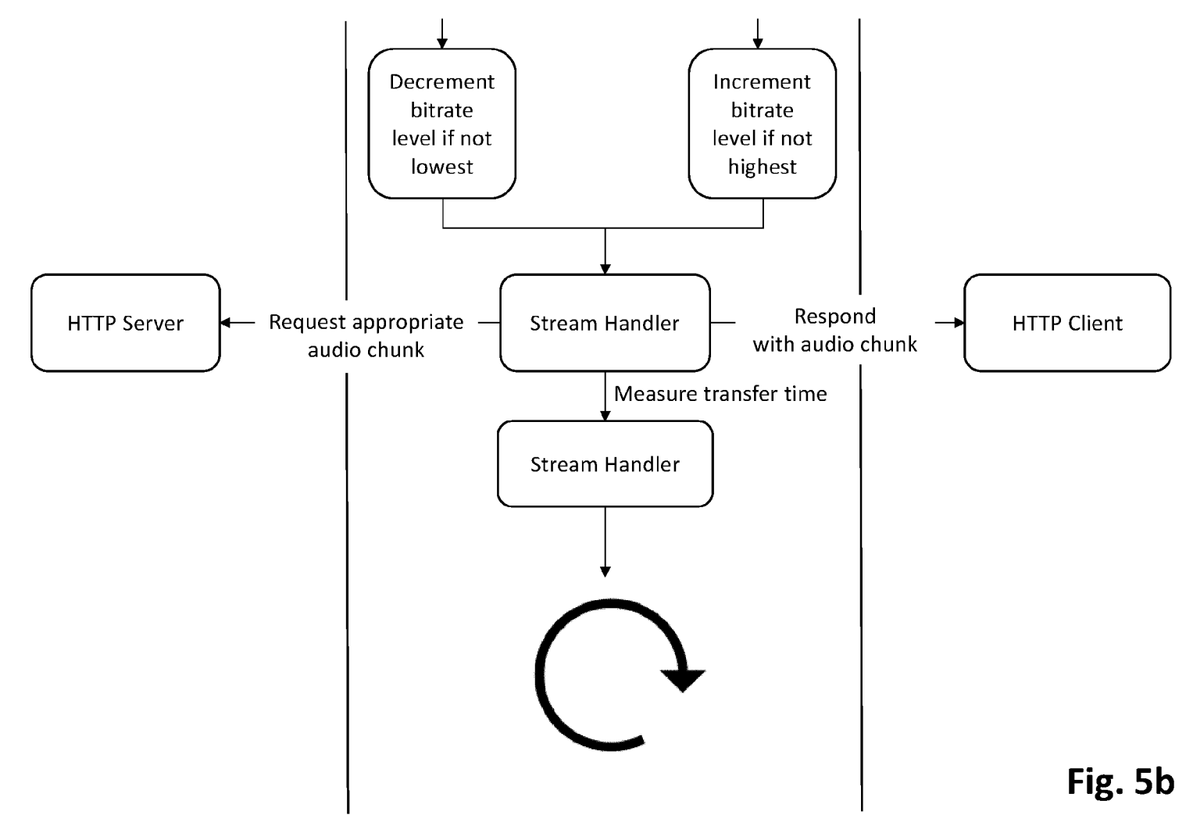

FIG. 5 summarizes the method of an embodiment and shows an exemplary interaction between the media preparation 100, streaming server 200 and the client 300. FIG. 5 has two parts, FIG. 5A and FIG. 5B. FIG. 5B is a continuation of FIG. 5A.

In particular, a HTTP client (corresponding to the client 300) requests stream from a streaming handler (e.g., part of the streaming server 200). The Streaming handler requests the appropriate chunk from a cluster server (e.g., representing the media preparation 100) which in this example is a HTTP server. It is noted that the transfer of chunks between encoder 100 and streaming server 200 can be any kind of transfer (e.g., meaning any protocol) including binary data exchange, e.g. an accessible file directory, an NFS network share, smb network share, http server and/or any other custom protocol.

The HTTP (e.g., cluster) server provides the requested chunks to the streaming server (not shown in FIG. 5), which sets up measurement of the transfer time, e.g. by storing a time stamp, and provides the chunks to the HTTP client. The streaming server measures the transfer time. This may be performed, for example, as a part of the HTTP protocol or TCP protocol or in any other way by monitoring feedback from the client, e.g. the timestamp at the start of the http transfer method is stored and another timestamp is evaluated at the end of the transfer of the given amount of data. As soon as this partial transfer is finished the time difference (e.g., delta) is calculated. The finishing of the transfer may be recognized based on acknowledgements received from the receiver of media data (e.g., the client) at the streaming server. For example, TCP acknowledgements and/or any other layer protocol acknowledgements, and/or in general any feedback from the client.

After the measurement is obtained, the streaming server may judge whether the transfer time is higher or lower than the audio (in general media) real time, meaning the playback time of the data transferred within the transfer time. If the transfer time is higher (e.g. higher by a first predetermined amount of time), the stream handler is called to decrement the bitrate level of the media (FIG. 5B). For example, the streaming server requests from the cluster server appropriate chunks, meaning chunks in a representation coded with lower bitrate than the chunks for which the transfer time was measured to be too high. These chunks are provided from the streaming server (e.g., by the streaming handler) to the client. Accordingly, irrespectively of the requests from the client to the streaming server, the streaming server controls the bitrate of the streaming to the client. This facilitates adaptive provision of streaming with automatic quality control by the streaming server.

If on the other hand, the transfer time is measured lower (e.g. lower by a second predetermined amount of time), the stream handler is called to increment the bitrate level of the media (FIG. 5B). For example, the streaming server requests from the cluster server appropriate chunks, meaning chunks in a representation coded with higher bitrate than the chunks for which the transfer time was measured to be too low. These chunks are provided from the streaming server (by the streaming handler) to the client. In this way, the client is provided with appropriate bitrate and it is avoided that a large buffer is needed at the client. For example, the streaming server provides automatically as good a quality of the media as the client can receive.

It is noted that the first predetermined amount of time may be the same as the second predetermined amount of time, but does not necessarily have to be the same. As also indicated in FIG. 5B, the increase and decrease of the bitrate may be limited by the availability of the chunks with the respective lower or higher bitrate. The bitrate may be decreased if it is not already at the lowest level supported. The bitrate may be increased if it is not already at the highest level supported.

This approach may be repeated during the transmission of the streaming. In particular, the transfer time may be measured for every chunk or for every predetermined number of chunks, e.g., continuously during the streaming. For less complex implementations, it is possible to perform the measurements not continuously but with certain periodicity, e.g., every 30 seconds, once a minute, and/or the like. In some implementations, the incrementing and decrementing may be performed stepwisely always by one quality level up or down. In other implementations, the appropriate quality level (e.g., bitrate) is chosen by the client which decides the quality for playback, e.g. HLS and MPEG-DASH. The quality of this implementation may not be forced server side and/or may heavily depend on the client's implementation of calculating the available bandwidth.

The streaming handler is a functional unit of the streaming server, which may be implemented in software run on the processing circuitry and/or embedded in the hardware of the processing circuitry.

According to some non-limiting embodiments or aspects, a computer program stored on a non-transitory storage medium, which when executed on a processor, performs one or more or all steps of any of the methods mentioned above. For example, the method may be embodied as a program code for the streaming server.

Figure 7:
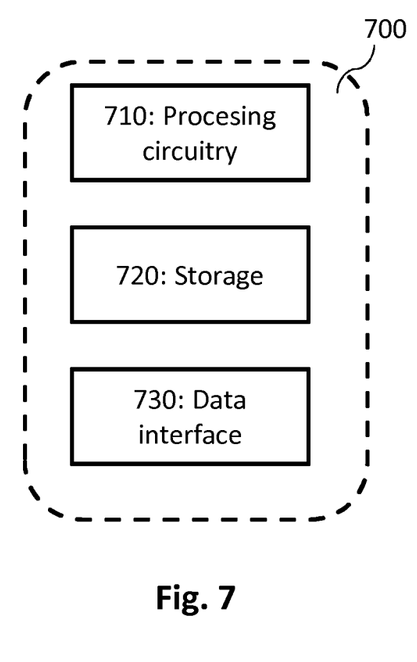
FIG. 7 is a block diagram illustrating an exemplary structure of a streaming server.

According to some non-limiting embodiments or aspects, as illustrated in FIG. 7, a streaming server 700 is provided comprising: an interface 730 for HTTP streaming of media data to a client and controllable by a processing circuitry 710. The processing circuitry 710 is configured to control the interface 730 to: receive a request for media data from a client; transmit to the client a first transmission unit including a first part of media data encoded by applying a first type of encoding, determine transfer time of the first transmission unit to the client, adjust bitrate of the streaming based on the determined transfer time by transmitting a second transmission unit including a second part of the media data encoded by applying a second type of encoding differing from said first type of encoding by bitrate.

The streaming server may further comprise a storage 720 configured to (e.g., temporarily) store chunks obtained from the media preparation server and/or from the own media storage.

Figure 6:
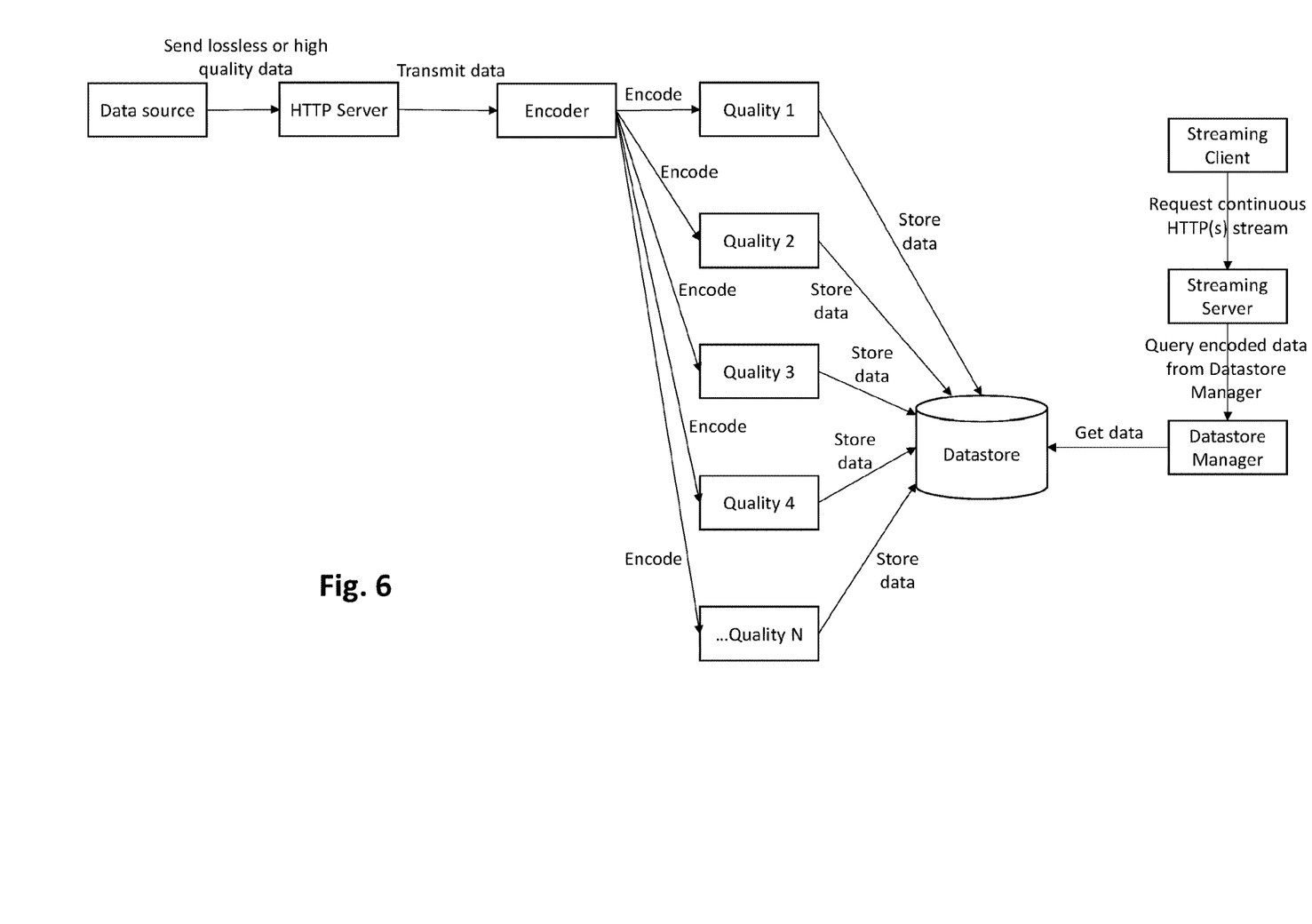
FIG. 6 is a block diagram showing a workflow in an exemplary architecture of a streaming system.

FIG. 6 illustrates an exemplary workflow between the data source and the client. For example, a data source provides raw, lossless, and/or high-quality lossy-coded data. The data source may be any direct source, such as a camera and/or a plurality of cameras. However, the data source may be a storage, e.g. located at a content provider, a portable storage, and/or any other source. The data source may provide the media data to a (e.g., HTTP) server corresponding to media preparation server 100, which encodes the media data with an encoder into N representations with the respective different quality levels (illustrated in FIG. 6 as Quality 1 . . . . Quality N). The encoded N representations are stored in a data storage accessible via data manager (e.g., also part to the media preparation server 100). The data manager may be requested by the streaming server to provide the appropriate chunk as described above. The data manager retrieves the appropriate chunk (e.g., a chunk in the sequence of chunks to be provided to the client and having the appropriate Quality k among the quality levels 1 to N). The appropriate quality level k may be determined based on the measurement of the transfer time and comparison with the playback time of the respective chunk and/or a plurality of chunks as described above with reference to FIGS. 5A and 5B. Thus, when a streaming client requests a continuous HTTP stream (such as the one supported by Icecast), the streaming server starts requesting the appropriate chunks, measuring the transfer time and transmitting the chunks to the client as a continuous HTTP stream with possibly varying bitrate adapted to the client capability/link quality.

In some non-limiting embodiments or aspects, a system is provided comprising: the streaming server 200 as described above further providing an interface to a storage; and the storage 100 storing therein media data cut into chunks of the same media time duration encoded with different bitrates and/or using different codecs, wherein the storage comprises an interface for providing chunks to the streaming server.

It is noted that the above description regarding methods may also apply to the corresponding apparatuses performing the steps of the method and vice versa.

Non-limiting embodiments or aspects of the present disclosure may be implemented by software, hardware or by any combination of both. For example, the streaming server may be a general purpose computer with one or more processors or a cluster of computers, wherein the functionality of the streaming server (such as streaming handler or data manager to communicate with the data manager in the media preparation server to fetch the appropriate chunks) is implemented by software. The software may configure the streaming server (e.g., one or more processors and/or memories) to perform the functionality. However, in general, non-limiting embodiments or aspects of the present disclosure are not limited to any particular implementation and deployment. Rather, the streaming server may be implemented entirely or partially by specialized or programmable hardware.

Summarizing, the present disclosure relates to media streaming and in particular to a media streaming method, program, server and system. A part of media is transmitted from a streaming server to a client and a transfer time is determined for the part of media. The transfer time is compared with the playback duration of the part of media. If the difference between the playback time and the transfer time exceeds a preconfigured value, the bitrate of the media is adjusted.

The invention claimed is:

1. A method for media streaming over HTTP to be performed by a streaming server, the method comprising:
receiving a request for media data from a client;
transmitting, to the client, a first transmission unit including a first part of the media data encoded by applying a first type of encoding of a plurality of different types of encoding having a plurality of different bitrates,
determining a transfer time of the first transmission unit to the client, judging whether or not the determined transfer time differs from a media time by more than a predetermined amount, and
adjusting a bitrate of the media streaming based on the determined transfer time by transmitting a second transmission unit including a second part of the media data encoded by applying a second type of encoding of the plurality of different types of encoding having a different bitrate of the plurality of different bitrates than said first type of encoding,
wherein the transmitting of the second transmission unit includes:
in response to the streaming server judging that the determined transfer time differs from the media time by more than the predetermined amount, selecting, from a storage storing a plurality of chunks including the second part of the media data encoded with the plurality of different types of encoding having the plurality of different bitrates, according to whether the transfer time is judged by the streaming server to be higher than the media time by more than the predetermined amount or lower than the media time by more than the predetermined amount, a chunk of the plurality of chunks including the second part of the media data encoded with the second type of encoding from among the plurality of chunks including the second part of the media data encoded with the plurality of different types of encoding having the plurality of different bitrates; and
transmitting the chunk to the client in a continuous HyperText Transfer Protocol (HTTP) stream.

2. The method according to claim 1, further comprising:
performing the adjusting when the transfer time is judged to differ from the media time by more than the predetermined amount, and not performing the adjusting when the transfer time is judged not to differ from the media time by more than the predetermined amount.

3. The method according to claim 2, wherein,
when the transfer time is judged to be higher than the media time by more than the predetermined amount, transmitting the second transmission unit including the second part of the media data encoded by applying encoding with a bitrate lower than said first type of encoding.

4. The method according to claim 3, wherein,
when the transfer time is judged to be lower than the media time by more than a second predetermined amount, transmitting the second transmission unit including the second part of the media data encoded by applying encoding with a bitrate higher than said first type of encoding.

5. The method according to claim 4, further comprising:
waiting a predetermined waiting time period before transmitting the second transmission unit, the predetermined waiting time period being determined according to the media time.

6. The method according to claim 1, further comprising:
receiving requests for the media data from a plurality of clients,
transmitting, to the plurality of clients, the media data in transmission units including media data with the same media time irrespectively of the type of encoding, and
transmitting, to the plurality of clients, additional media data in transmission units including media data with the same media time irrespectively of the type of encoding and the client, wherein the additional media data differs for the clients out of the plurality of clients by content.

7. The method according to claim 1, further comprising:
receiving, from the client, a connection request;
establishing a connection with the client in a client-specific thread; and
storing a time instant of a start of the connection for the client.

8. The method according to claim 1, wherein the media data comprises audio data.

9. The method according to claim 8, wherein the media streaming comprises an Icecast compatible streaming.

10. The method according to claim 9, further comprising:
obtaining media data in chunks from a plurality of respective media files;
ordering consecutive chunks into a continuous stream; and
transmitting the continuous stream to the client according to Icecast protocol.

11. A computer program stored on a non-transitory storage medium, which when executed on a processor, causes the processor to:
receive a request for media data from a client;
transmit, to the client, a first transmission unit including a first part of the media data encoded by applying a first type of encoding of a plurality of different types of encoding having a plurality of different bitrates,
determine a transfer time of the first transmission unit to the client,
judge whether or not the determined transfer time differs from a media time by more than a predetermined amount, and
adjust a bitrate of the media streaming based on the determined transfer time by transmitting a second transmission unit including a second part of the media data encoded by applying a second type of encoding of the plurality of different types of encoding having a different bitrate of the plurality of different bitrates than said first type of encoding,
wherein the computer program, when executed on the processor, causes the processor to transmit the second transmission unit by:
in response to the streaming server judging that the determined transfer time differs from the media time by more than the predetermined amount, selecting, from a storage storing a plurality of chunks including the second part of the media data encoded with the plurality of different types of encoding having the plurality of different bitrates, according to whether the transfer time is judged by the streaming server to be higher than the media time by more than the predetermined amount or lower than the media time by more than the predetermined amount, a chunk of the plurality of chunks including the second part of the media data encoded with the second type of encoding from among the plurality of chunks including the second part of the media data encoded with the plurality of different types of encoding having the plurality of different bitrates; and
transmitting the chunk to the client in a continuous HyperText Transfer Protocol (HTTP) stream.

12. A streaming server comprising:
processing circuitry; and
an interface for HyperText Transfer Protocol (HTTP) streaming to a client and controllable by the processing circuitry;
wherein the processing circuitry is configured to:
receive a request for media data from a client;
transmit, to the client, a first transmission unit including a first part of the media data encoded by applying a first type of encoding of a plurality of different types of encoding having a plurality of different bitrates,
determine a transfer time of the first transmission unit to the client,
judge whether or not the determined transfer time differs from a media time by more than a predetermined amount, and
adjust a bitrate of the HTTP streaming based on the determined transfer time by transmitting a second transmission unit including a second part of the media data encoded by applying a second type of encoding of the plurality of different types of encoding having a different bitrate of the plurality of different bitrates than said first type of encoding,
wherein the processing circuitry is configured to transmit the second transmitting unit by:
in response to the streaming server judging that the determined transfer time differs from the media time by more than the predetermined amount, selecting, from a storage storing a plurality of chunks including the second part of the media data encoded with the plurality of different types of encoding having the plurality of different bitrates, according to whether the transfer time is judged by the streaming server to be higher than the media time by more than the predetermined amount or lower than the media time by more than the predetermined amount, a chunk of the plurality of chunks including the second part of the media data encoded with the second type of encoding from among the plurality of chunks including the second part of the media data encoded with the plurality of different types of encoding having the plurality of different bitrates; and transmitting the chunk to the client in a continuous HTTP stream.

13. The streaming server according to claim 12, the processing circuitry being further configured to:
perform the adjusting when the transfer time is judged to differ from the media time by more than the predetermined amount, and
not perform the adjusting when the transfer time is judged not to differ from the media time by more than the predetermined amount.

14. The streaming server according to claim 13, wherein, when the transfer time is judged to be higher than the media time by more than the predetermined amount, transmitting the second transmission unit including the second part of the media data encoded by applying encoding with a bitrate lower than said first type of encoding.

15. The method according to claim 13, wherein, when the transfer time is judged to be lower than the media time by more than a second predetermined amount, transmitting the second transmission unit including the second part of the media data encoded by applying encoding with a bitrate higher than said first type of encoding.

16. The streaming server according to claim 15, the processing circuitry being configured to perform waiting a predetermined waiting time period before transmitting the second transmission unit, the predetermined waiting time period being determined according to the media time.

17. The streaming server according to claim 12, wherein the processing circuitry is configured to control the interface to:
receive requests for the media data from a plurality of clients,
transmit, to the plurality of clients, the media data in transmission units including media data with the same media time irrespectively of the type of encoding,
transmit, to the plurality of clients, additional media data in transmission units including media data with the same media time irrespectively of the type of encoding and the client, wherein the additional media data differs for the clients out of the plurality of clients by content.

18. The streaming server according to claim 12, wherein the processing circuitry is further configured to:
receive from the client a connection request;
establish a connection with the client in a client-specific thread; and
store a time instant of a start of the connection for the client.

19. The streaming server according to claim 12, wherein the media data comprises audio data.

20. The streaming server according to claim 19, wherein the HTTP streaming comprises an Icecast compatible streaming.

21. The streaming server according to claim 20, wherein the processing circuitry is configured to:
obtain media data in chunks from a plurality of respective media files;
order consecutive chunks into a continuous stream; and
transmit the continuous stream to the client according to Icecast protocol.

22. A system comprising:
the streaming server according to claim 12; and
the storage storing the plurality of chunks including the second part of the media data encoded with the plurality of different types of encoding having the plurality of different bitrates, wherein each chunk of the plurality of chunks includes the media data cut into a chunk of a same media time duration,
wherein each chunk of the plurality of chunks includes the second part of the media data encoded with a different type of encoding of the plurality of different types of encoding than the other chunks of the plurality of chunks such that each chunk of the plurality of chunks includes a different representation of the same media of a same media time duration encoded at a different bitrate than the other chunks of the plurality of chunks, and
wherein the storage comprises an interface for providing the plurality of chunks to the streaming server.

23. The method according to claim 1, further comprising:
storing, in the storage, the plurality of chunks including the second part of the media data encoded with the plurality of different types of encoding having the plurality of different bitrates,
wherein each chunk of the plurality of chunks includes the second part of the media data encoded with a different type of encoding of the plurality of different types of encoding than the other chunks of the plurality of chunks such that each chunk of the plurality of chunks includes a different representation of the same media of a same media time duration encoded at a different bitrate than the other chunks of the plurality of chunks.

* * * * *